Patented June 30, 1953

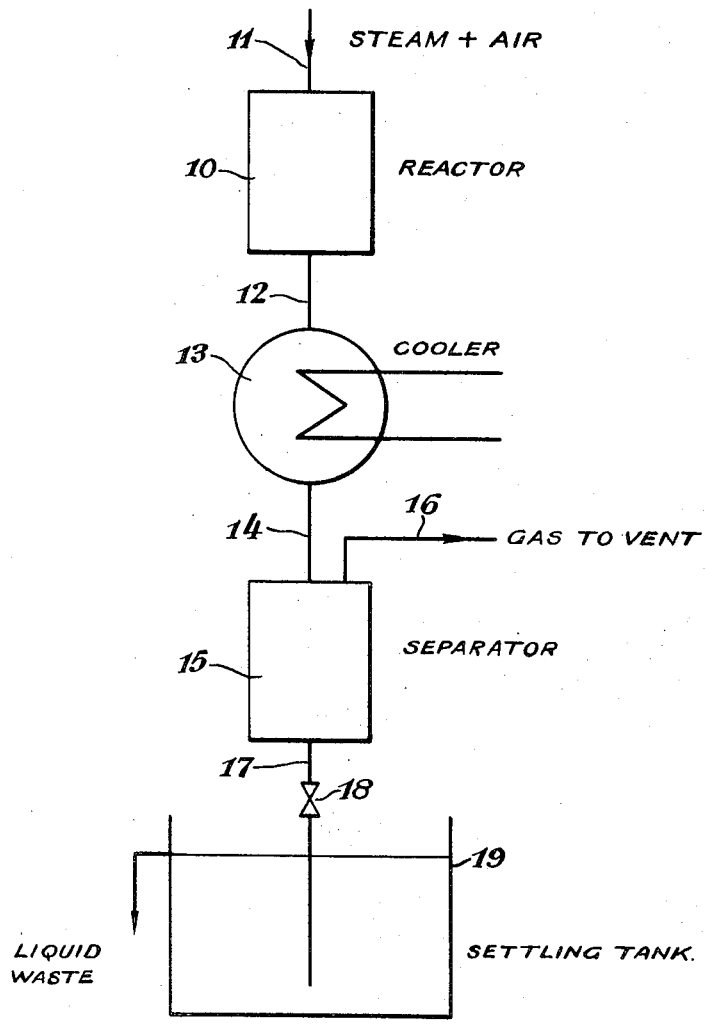

2,643,939

UNITED STATES PATENT OFFICE 2,643,939

PROCESS FOR RECOVERY OF SULFUR FROM SULFUR-CONTAMINATED METALLIC CATALYSTS

Frederick William Bertram Porter and Roy Purdy Northcott, Sunbury-on-Thames, England, assignors to Anglo-Iranian Oil Company Limited, London, England, a British joint-stock corporation Application September 9, 1949, Serial No. 114,768
In Great Britain September 15, 1948

1 Claim. (Cl. 23—225)

The invention relates to a process for the recovery of sulphur from sulphur-contaminated catalysts.

Catalysts used in the petroleum industry frequently become contaminated with carbon so that they require to be regenerated at intervals in order to restore their catalytic activity. As the feedstocks in catalytic petroleum processes generally contain sulphur, the catalysts also become contaminated with sulphur which is likewise removed during the regeneration period.

The principal object of the present invention is to provide a method of recovering the sulphur from such sulphur-contaminated catalysts.

If a sulphur-contaminated catalyst is regenerated by heating in a current of air, the sulphur is removed from the catalyst in the form of sulphur dioxide, while if the catalyst is regenerated by heating in a current of steam and air, the sulphur is removed from the catalyst in the form of a mixture of sulphur dioxide and hydrogen sulphide. Sulphur dioxide reacts with hydrogen sulphide to form free sulphur and water in accordance with the equation:

$$SO_2 + 2H_2S \rightleftharpoons 3S + 2H_2O$$

The reaction is reversible, lowering the temperature tending to shift the equilibrium to the right, and the reverse taking place by increasing the temperature. Thus, on cooling the mixture free sulphur is obtained.

According to the invention, therefore, sulphur is recovered from a sulphur-contaminated catalyst by heating the catalyst in a current of steam and air and cooling the gases leaving the regeneration zone to cause the sulphur to be deposited as free sulphur.

The sulphur may be recovered by passing the sulphur-contaminated gases into water whereupon the sulphur settles out and may be separated by decanting the water.

The invention is particularly applicable to processes using metallic oxide catalysts which are easily convertible to the sulphide state, such for example, as catalysts containing cobalt and molybdenum oxides on alumina. In processes utilising catalysts of this type a considerable amount of sulphur from the feedstock is retained on the catalyst and the recovery of the sulphur would be profitable.

The invention may be carried into effect according to the following mode of operation described with reference to the accompanying flow diagram.

A catalyst which has become contaminated with sulphur as a result of being used in a catalytic desulphurisation process is regenerated in situ in the reactor 10 by heating to an elevated temperature, of the order of 1100° F., in a current of air and steam introduced via line 11. The steam and gas mixture leaving the reactor 10 is passed via line 12 to a cooler 13 where it is cooled to a temperature of the order of 60–80° F. The reaction products, comprising gaseous products, sulphur and water, are passed from the cooler 13, via line 14, to a separator 15 wherein the gaseous products are separated and passed to vent via line 16. The sulphur and water are passed via line 17 and valve 18 to a settling tank 19, containing water, wherein the sulphur soon settles out and may be recovered in the form of finely divided particles of sulphur by decanting the water. The fact that the sulphur suspension is acid, due to the presence of hydrogen sulphide and sulphur dioxide, assists the settling operation.

One particular example of the above mode of operation will now be described.

Example

A catalyst consisting of cobalt molybdate on alumina was used in the catalytic desulphurisation of a virgin gas oil having a sulphur content of 1% by weight. The desulphurisation operation was carried out under the following processing conditions:

Temperature_____ 780° F.
Pressure_____ 115 p. s. i. ga.
Space velocity_____ 2.0 v./v./hr.
Gas recycle rate_____ 4000 S. C. F. B.
Duration_____ 125 hrs.

The catalyst had about 5.6% wt. sulphur deposited on it. Regeneration was carried out under the following conditions:

Reactor inlet temperature_____ 870° F.
Maximum catalyst bed temperature___ 1125° F.
Steam flow_____ 1.5 lb./hr.
Air flow_____ 2.4 c. f./hr.
Duration of regeneration_____ 24 hrs.

51 grams of sulphur were burned off the catalyst of which 17.9 grams (i. e. 35%) were recovered by the process of the invention. The sulphur obtained from a simple settling operation was of about 92% purity.

We claim:

A process for the recovery of sulphur from sulphur-contaminated metallic catalysts comprising regenerating the sulphur-contaminated catalyst in a regenerating zone at a temperature on the order of about 1100° F. in a current of steam and air to produce an effluent of a sulphurous steam and gas mixture, cooling said effluent leaving the regeneration zone by indirect heat exchange to a temperature of the order of about 60–80° F. to effect a reaction of sulphur dioxide and hydrogen sulphide to effect the formation of free sulphur, separating the gaseous products from the reaction mixture containing the free sulphur passing the reaction mixture into a body of water, allowing the sulphur to settle out, and decanting the water from the settled sulphur to recover same in the form of finely divided particles.

FREDERICK WILLIAM
    BERTRAM PORTER.
ROY PURDY NORTHCOTT.

References Cited in the file of this patent

UNITED STATES PATENTS

| Number | Name | Date |
|---|---|---|
| 945,926 | Fleming | Jan. 11, 1910 |
| 1,832,217 | Joseph | Nov. 17, 1931 |
| 1,895,062 | Zurcher | Jan. 24, 1933 |
| 1,925,027 | Bollmann et al. | Aug. 29, 1933 |
| 2,043,084 | Ward et al. | June 2, 1936 |
| 2,258,305 | Stirlen | Oct. 7, 1941 |
| 2,425,754 | Murphee et al. | Aug. 19, 1947 |
| 2,546,031 | Hanson | Mar. 20, 1951 |

FOREIGN PATENTS

| Number | Country | Date |
|---|---|---|
| 337,348 | Great Britain | Oct. 23, 1930 |

OTHER REFERENCES

Mellor "Comprehensive Treatise on Inorganic and Theoretical Chemistry," vol. 10, page 91, Longmans, Green and Co., N. Y.